March 12, 1968    R. C. BATES ETAL    3,372,577
PRESSURE MEASURING DEVICE EMPLOYING A DIAPHRAGM
AND STRAIN GAGES
Filed Jan. 12, 1967

INVENTORS
ROBERT C. BATES
ERNEST L. CORP

ATTORNEY

United States Patent Office 3,372,577
Patented Mar. 12, 1968

3,372,577
PRESSURE MEASURING DEVICE EMPLOYING A DIAPHRAGM AND STRAIN GAGES
Robert C. Bates and Ernest L. Corp, Spokane, Wash., assignors to the United States of America as represented by the Secretary of the Interior
Filed Jan. 12, 1967, Ser. No. 608,943
10 Claims. (Cl. 73—88.5)

ABSTRACT OF THE DISCLOSURE

A pressure measuring device with an outer pressure sensitive diaphragm having four strain gages bonded to its inner face. The arrangement and Wheatstone bridge circuitry of the gages are such that temperature and lateral forces against the diaphragm have substantially no effect on bridge output. A collar surrounding the diaphragm has notches adjacent those gages in the peripheral area of the diaphragm so that stress concentrations are prevented in this area.

---

This invention relates to a device for measuring stresses within a granular mass.

In mining and construction work it often becomes desirable to measure free-field stresses within the earth and fill materials which surround the mine supports, building foundations, retaining walls, rigid culverts, etc. Likewise, in the building of storage facilities it is expedient to know the free-field stresses within contained granular masses of sand, gravel, cement, chemicals, grain, silage, etc.

Diaphragm-type pressure responsive units imbedded in the granular mass offer a convenient way to obtain such free-field stress measurements. However, the use of these devices is complicated by many factors. For example, in order to accurately measure these stresses with the aid of such a device, the inward deflection of the unit's sensitive face should be less than one two-thousandth of the face diameter, although a deflection not in excess of one one-thousandth will not seriously affect the accuracy of the device for soil pressure measurements. If excessive inward deflection takes place, arching will occur in the granular mass over the diaphragm face, and an erroneous reading will result. Several measuring devices presently in use satisfy this requirement, but their capacity is far below the 1500 p.s.i.g. pressure capacity required for many soil pressure measurement situations.

Another complicating factor in connection with the use of diaphragm-type devices is the requirement that the presence of the pressure sensing unit imbedded within the granular mass mut not excessively alter the existing granular material stress field. If the deformation moduli of the device and the granular material are not equal or if the cell thickness is greater than one-fifth the cell diameter, the stress field is altered significantly by the device, and an erroneous measurement will be made. Presently employed units that substantially meet this requirement have pressure measuring capacities of less than 50 p.s.i.g.

Finally, existing pressure responsive units are too sensitive to stresses perpendicular to the stress measuring direction. When a unit is effected by such lateral forces, erroneous readings from forces normal to the diaphragm will result.

We have now invented a diaphragm-type measuring device that overcomes many of these disadvantages. Generally, the device comprises a diaphragm fabricated as an integral part of the upper half of the pressure responsive unit. Bonded to the inner face of the diaphragm are four strain gages connected to form a Wheatstone bridge circuit across which a small excitation voltage is applied, the gages being aligned so that their longitudinal axes are substantially coincident with one another and with a diametrical axis on the diaphragm. A readout instrument is remotely, electrically connected to the gages in the usual manner.

It is therefore an object of the present invention to provide a granular mass pressure measuring device that can withstand pressure up to 1500 p.s.i.g.

Another object is to provide a diaphragm-type measuring device which maintains a sensitive face deflection-diameter ratio of 1:1000 or less.

A further object is to provide a strain gage measuring device wherein the gages are arranged to have a low lateral sensitivity to granular mass stresses and to be substantially unaffected by temperature changes.

A still further object is to provide a measuring device wherein the overall thickness is less than one-fifth the overall diameter.

A still further object is to provide a device with the long life stability offered by a simple electrical system.

Other objects and advantages will be obvious from the detailed description of the device appearing in the specification taken in conjunction with the following drawings in which.

Figure 1:
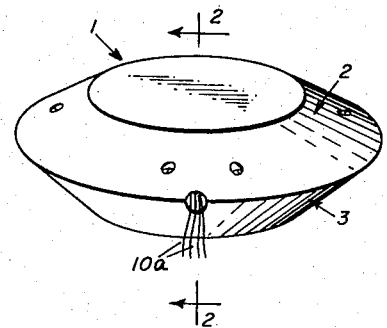
FIG. 1 is a perspective view of the pressure responsive unit.
Figure 2:
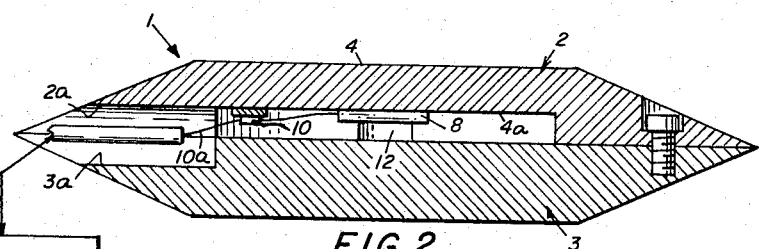
FIG. 2 is a vertical cross-sectional view of the unit taken along the line 2—2 of FIG. 1 in combination with a schematically shown readout instrument and power source.

Referring to FIGS. 1 and 2, the disc-shaped pressure responsive unit 1 made of, for example, stainless steel consists of bolted plates 2 and 3 sealed together with commercial adhesives. To minimize the formation of distinct shear planes in the granular material surrounding the unit, the unit is tapered toward the periphery as shown. Minimization of this shear will reduce pressure reading errors which result from the effects of arching around a rigid inclusion (foreign object) in a granular mass.

As shown in FIG. 2, upper plate 2 contains a circular diaphragm 4 and a collar 5 surrounding the periphery of the diaphragm, both parts machined or otherwise fabricated as an integral part of the plate. By manufacturing the upper plate 2 as a singular, unitary body, the problems of welding or soldering a diaphragm in place are eliminated along with the low pressure capabilities of such a welded or soldered diaphragm.

Figure 3:
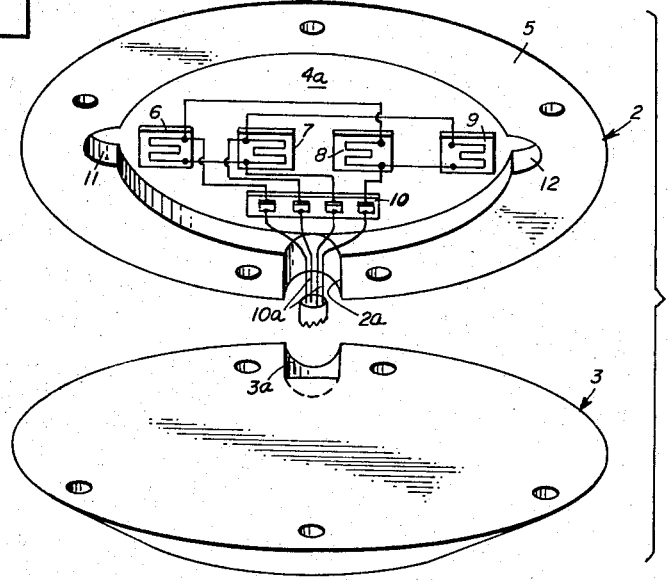
FIG. 3 is an exploded perspective view of the unit.
Figure 4:
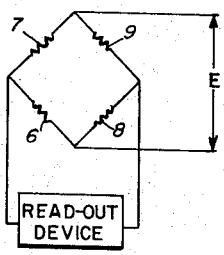
FIG. 4 is a diagram of the circuitry of the strain gages in combination with a schematically shown power source and readout device.

Referring to FIGS. 3 and 4, strain gages 6, 7, 8, 9 are bonded to the inner face 4a of diaphragm 4. All four gages are connected together to form a Wheatstone bridge circuit having a 5 or 10 volt excitation voltage (FIG. 4), and the gages are aligned so that their longitudinal axes are substantially coincident with one another and with a diametrical axis on the inner diaphragm face 4a. Reference numeral 10 designates a terminal strip to which the wires from the gages are connected. A groove 2a in plate 2 and an opposite groove 3a (shown in FIG. 2) in plate 3 define an opening in the pressure responsive unit through which the wires 10a from the terminal strip pass to a power source and readout instrument.

In operation, diaphragm 4 behaves as a fixed edge plate, and as the pressure is exerted against the unit from the granular material around the unit, forces normal to the diaphragm moves it inward putting the central portion of the inner face of the diaphragm in tension and the peripheral region of the inner face in compression. Under a purely normal force against the outer face of the diaphragm, gages 7 and 8 bonded in the tension zone are subject to elongation while gages 6 and 9 bonded in the compression zone are shortened. Since the bridge output as shown in FIG. 4 is equal to the sum of the electrical effects on gages 7 and 8 minus the sum of the effects on gages 6 and 9, and since it can be assumed that gage shortening has a negative electrical effect while elongation has a positive effect, the bridge output from a normal force will be equal to four times the magnitude of the force on any one gage.

Sensitivity of the pressure responsive unit to lateral forces against the diaphragm is minimized due to the straight line gage arrangement and the Wheatstone bridge circuitry shown in FIG. 4. More specifically, since a lateral force against the diaphragm 4 will have substantially the same shortening or elongation effect on each of the aligned gages located on a diametrical axis of the diaphragm, the bridge output from such a force will be equal to or approximate zero. Furthermore, to minimize the effect of stress concentrations that would normally develop at gage 6 or 9 from lateral forces (especially lateral point loads) on the peripheral edges of the unit, notches 11 and 12, best shown in FIG. 3, are provided in collar 5 in the underside of plate 2 in an area immediately adjacent gages 6 and 9, respectively. Such notches remove these gages from the stress concentration area.

The pressure responsive unit is also temperature compensated. Output of the strain gages resulting from temperature caused expansion or contraction of the pressure responsive unit is nullified by the arrangement of the gages and the Wheatstone bridge circuitry.

Any convenient instrument that can measure decimal parts of a millivolt with reasonable precision can be employed to measure the output of the pressure sensitive unit. For example, a strain gage indicator, x–y chart recorder, a strip chart recorder or digital voltmeter could be employed.

Overall dimensions of the unit can be 0.3 inch thick and 1.8 inches in diameter, the diaphragm being 0.1 inch thick. Each gage can be a 1/8 inch strain gage. Grooves 2a and 3a, which define the opening in the unit through which external lead wires extend, can be 3/16 inch in diameter. All electrical parts should be covered with waterproofing compound which also provides a mechanical separation between the lead wires and other parts of the unit. A number of commercial adhesives can be used to provide an airtight seal between plates 2 and 3, around the lead wires, and in the lead wire opening.

When a pressure responsive unit having the above dimensions was tested several times, under a normal pressure of 1000 p.s.i.g., the average deviation of those readings which were not exactly 1000 p.s.i.g. (i.e., repeatability) was 1 p.s.i. When the unit was further tested several times for lateral sensitivity under a purely lateral load of 1000 p.s.i.g., the average readout instrument reading was 15 p.s.i.g. As can be seen from the results of both series of tests, the device is very accurate with regard to normal loads while the effect of lateral forces has been substantially eliminated.

While the particular device herein described is well adapted to carry out the objects of the present invention, it is to be understood that various modifications and changes may be made all coming within the scope of the following claims.

What is claimed is:
1. A pressure measuring device comprising a pressure responsive unit having

(a) an outer diaphragm responsive to pressure exerted by material external to said unit;
(b) two central strain gages bonded to the inner face of said diaphragm at the central, tension zone thereof;
(c) two peripheral strain gages bonded to the inner face of said diaphragm at the peripheral, compression zone thereof;
said four gages being aligned in a straight line so that ther longitudinal axes are substantially coincident with one another and with a diametrical axis on said inner face of said diaphragm, said four gages wired together to form a Wheatstone bridge circuit wherein the output is equal to the sum of the electrical effects on said two central gages minus the sum of the effects on said two peripheral gages.

2. The device of claim 1 wherein said unit further includes a collar surrounding the periphery of said diaphragm, said collar having two notches each of which is immediately adjacent one of said peripheral gages to substantially prevent stress concentrations within the area of said peripheral gages.

3. The device of claim 1 wherein said unit comprises two plates in sealing engagement, one of said plates being fabricated as a single, unitary body which includes said outer diaphragm.

4. The device of claim 2 wherein said unit comprises two plates in sealing engagement, one of said plates being fabricated as a single, unitary body which includes said outer diaphragm and said collar.

5. The device of claim 3 wherein each of said plates includes a groove in the surface of said plate which engages the other plate, said grooves being opposite one another to define an opening in said unit through which wires from said strain gages can pass to a readout instrument and power source.

6. The device of claim 4 wherein each of said plates includes a groove in the surface of said plate which engages the other plate, said grooves being opposite one another to define an opening in said unit through which wires from said strain gages can pass to a readout instrument and power source.

7. The device of claim 3 wherein said engaged plates define a disc-shaped pressure responsive unit which is tapered toward its periphery.

8. The device of claim 4 wherein said engaged plates define a disc-shaped pressure responsive unit which is tapered toward its periphery.

9. The device of claim 5 wherein said engaged plates define a disc-shaped pressure responsive unit which is tapered toward its periphery.

10. The device of claim 6 wherein said engaged plates define a disc-shaped pressure responsive unit which is tapered toward its periphery.

References Cited

UNITED STATES PATENTS 3,235,826    2/1966    Crites _____ 73—398 XR
3,286,514   11/1966    Anderson _____ 73—88.5

LOUIS R. PRINCE, Primary Examiner.

DONALD O. WOODIEL, Assistant Examiner.